Patented Oct. 27, 1942

2,299,917

UNITED STATES PATENT OFFICE 2,299,917

SULPHUR COMPOSITION

Forest R. Minger and Wayne L. Scoles, Midland, Mich., assignors to The Dow Chemical Company, Midland, Mich., a corporation of Michigan No Drawing. Application April 2, 1941, Serial No. 386,500

8 Claims. (Cl. 167—20)

This invention relates to new sulphur products and is particularly concerned with finely-divided parasiticide compositions consisting predominantly of activated sulphur.

Finely-divided sulphur is widely employed as a constituent of agricultural sprays and dusts for the control of fungous and insect pests. Sulphur is normally resistant to wetting and in parasiticidal compositions is generally compounded with various wetting and dispersing agents calculated to render such compositions readily dispersible in water. A further characteristic of raw sulphur resides in the tendency of fine particles thereof to associate on standing so as to form crystal aggregates of such size as to be unsatisfactory in parasiticidal control. This characteristic is commonly corrected by coating the individual particles with a protective colloid.

We have discovered that improved sulphur products are obtained when conventional commercial sulphur dusts are modified with a small proportion of a partially bacteria-digested sewage sludge. Such modified sulphurs show increased fungicidal effectiveness greatly in excess of the additive fungicidal characteristics of the original sulphur and the sludge. A preferred sludge product according to the present invention is activated sewage sludge.

The expression "partially bacteria-digested sewage sludge" refers to sewage which has been subjected to the action of bacteria under aerobic and/or anaerobic conditions so as to decompose a portion only of its initial organic solids content. Following such partial digestion, the mixture is processed to separate the liquid constituents from the solid, the separated sludge being employed according to the present invention.

The expression "activated sewage sludge" refers to the product obtained by the agitation of a mixture of raw sewage with a substantial proportion of a bacterially-active liquid sludge in the presence of ample atmospheric oxygen for a sufficient period of time to at least coagulate a large proportion of the colloidal substances. The partially digested sludge is then subjected to sedimentation adequate for the subsidence of the sludge flocculi. The bacterially-active liquid sludge employed as a starter is obtained by the previous aeration and incubation of raw sewage and is maintained in its active condition by intermittent aeration and contact with fresh sewage.

The expression "a minor proportion" as herein employed with respect to the amount of sewage sludge product employed in the composition to which the present invention is directed refers to an amount less than 50 per cent by weight of such composition. The exact amount of any particular sludge product employed depends upon the nature of the sludge and the use for which the sulphur-sludge composition is intended. With activated sewage-sludge, as hereinbefore defined, from 1 to 20 per cent by weight on the basis of the sulphur employed has been found satisfactory.

In operating according to the present invention, finely-divided sulphur or a composition consisting primarily of sulphur and wetting agents is intimately mixed with the sludge product. This may be accomplished by grinding the sulphur with the dried sludge, by emulsifying the sludge and sulphur product in water and evaporating off the water to leave a solid residue, by heating a mixture of sulphur and sludge to a temperature above the melting point of sulphur and thereafter grinding the cooled solid fusion product, or by any other suitable mixing, grinding, or homogenizing process.

A preferred method comprises dispersing sulphur, suitable wetting agents, and the sludge product in water and heating and stirring the mixture under pressure to a temperature above the melting point of the sulphur to form an emulsion of the sulphur in water. During this step the sludge particles disintegrate and disperse throughout the body of the emulsion. This mixture is then quickly cooled to below the melting point of the sulphur to prevent coalescence of the sulphur particles, the water removed by evaporation, and the dried residue ground to any desired particle size. In an alternate procedure such hot sulphur emulsion may be passed through a suitable homogenizer and thereafter cooled, evaporated to dryness, and ground.

Regardless of the exact procedure followed, a modified sulphur product is obtained which has superior parasiticidal properties. The exact physical properties of the product so obtained are dependent upon the sulphur composition employed as a starting material, the nature of wetting and dispersing agents incorporated with the mixture, and the amount and nature of the sludge product employed. For obtaining products of minimum particle size and maximum stability on storage, a preferred component of the composition consists of the alkali metal salts of phenol-sulphonic acids. Other modifying agents which may be incorporated in the mixture include bentonite, diatomaceous earth, tricalcium phosphate, ammonia, caustic, rosin, dried sulfite waste liquor, various dyes and pigments, and the like. Similarly, the compositions may be modified or fortified with common fungicidal and insecticidal toxicants.

In determining the comparative parasiticidal effectiveness of the compositions set forth in the following examples a convenient testing method comprised applying the dry finely-divided compositions to vigorous fungous growths on agar-agar surfaces and measuring the degree to which the growth of such organism was controlled. A representative procedure comprised seeding the center of an agar-agar surface with an innoculum disc of *Diplodia pinea*. The culture-containing plate was then incubated until the mycelia of the mold covered a space 20 millimeters in diameter. One-half of the agar-agar surface and molded portion thereof was then masked and the unmasked portion dusted with 1.26 milligrams of the test composition per square centimeter. The mask was then removed and the plate incubated for 3 days under controlled conditions of temperature and humidity. The increase in diameter of growth of the mold mycelia was then measured on both the treated and untreated portions of the plate. The effectiveness of the treatment was calculated in terms of per cent inhibition of growth on the dusted portion as compared to the growth observed on the untreated portion of the agar-agar surface.

Example 1

An activated sewage sludge was employed in the preparation of a finely-divided sulphur dust composition substantially according to the preferred method of preparation as set forth above. This activated sewage sludge was a dry commercial fertilizer marketed as "Milorganite." This product is described as prepared by the partial digestion of raw sewage with aerobic bacteria (Cramer and Wilson in Industrial and Engineering Chemistry, page 4, vol. 20, No. 1, January, 1928).

In the preparation of this modified composition 1871 pounds of flowers of sulphur, 40 pounds of the activated sludge, 40 pounds of rosin, 30.5 pounds of 28 per cent ammonia, and 0.5 pound of alkyl-phenylphenol-sulphonic acid sodium salt were dispersed in about 1700 pounds of water and stirred and heated under pressure to a temperature above the melting point of the sulphur, whereby a coarse sulphur in water emulsion resulted. This emulsion was passed under pressure through a mechanical homogenizer wherein the molten sulphur globules were broken down to give a slurry of finely-dispersed sulphur and sludge. The composition was discharged from the homogenizer into a zone of lower pressure, whereby the fine sulphur particles solidified without having an opportunity to coalesce, and a substantial proportion of the suspending water was flash-evaporated from the mixture. The thick slurry so obtained was dried to evaporate off remaining water and thereafter ground in a hammer mill with 40 pounds of tricalcium phosphate to obtain a finely-divided sulphur dust product having an average particle size of 6-8 microns diameter.

This product was tested along with several commercial sulphur dusts and the dried activated sewage sludge alone to determine the comparative fungicidal effectiveness of the sulphur-sludge mixture. The method employed is that set forth above. The following table is representative of the results obtained:

Table

| Composition | Method of preparation | Particle size | Inhibition of mold mycelia growth |
|---|---|---|---|
| | | *Microns* | *Per cent* |
| Sludge and sulphur mixture. | According to present example. | 6-8 | 68 |
| Sulphur and wetting agent. | Duplicate of sulphur-sludge mixture without sludge. | 6.5 | 21 |
| Finely-divided dry sludge. | Commercial product "Milorganite." | -------- | 1 0 |
| Commercial sulphur dust A. | Micronized product containing no wetting agent. | 5 | 11.5 |
| Commercial sulphur dust B. | Emulsified and homogenized and thereafter washed to remove wetting agent. | 4.5 | 22 |
| Commercial sulphur dust C. | Unknown. | 11.5 | 39 |

¹ Slight stimulation of mycelia growth.

Example 2

In a similar manner other compositions were prepared by mixing sulphur with activated sewage sludge to obtain mixtures having improved parasiticidal properties. The following compositions are representative:

Composition A

| | Parts |
|---|---|
| Sulphur | 98 |
| Activated sewage sludge | 1 |
| Sodium hydroxide | 1 |

This composition was prepared by emulsification and homogenization and had a particle size of 10–15 microns diameter.

Composition B

| | Parts |
|---|---|
| Sulphur | 98 |
| Activated sewage sludge | 2 |

This composition is prepared by mechanical grinding to an average particle size of 10–15 microns diameter.

Composition C

| | Parts |
|---|---|
| Sulphur | 80 |
| Activated sewage sludge | 15 |
| Bentonite | 5 |

This composition may be prepared by fusing together the several constituents and thereafter grinding the cooled cake to any desired state of subdivision.

In a similar manner other sludge products may be employed to modify raw sulphur or various commerically available sulphur dust products. Representative of such materials are those which have been subjected to partial anaerobic decomposition and to both anaerobic and aerobic bacterial attack. The dried sulphur-sludge compositions so obtained and those of the preceding examples are adapted to be employed either as agricultural dusts or dispersed in water as agricultural sprays for the control of both insect and fungous parasites. In the preparation of such compositions the sewage sludge products to which the preceding discussion has been directed have been found greatly superior to such unprocessed materials as raw sewage and animal, bird, and human excreta.

We claim:

1. A finely-divided agricultural parasiticide comprising sulphur and a partially bacteria-digested sewage sludge.

2. A finely-divided agricultural parasiticide consisting essentially of sulphur, wetting and dispersing agents, and a partially bacteria-digested sewage sludge.

3. A finely-divided agricultural parasiticide comprising sulphur and an activated sewage sludge.

4. A finely-divided agricultural parasiticide consisting essentially of sulphur, wetting and dispering agents, and an activated sewage sludge.

5. A finely-divided stabilized sulphur dust, activated as regards parasiticidal toxicity by the presence of a minor proportion of an activated sewage sludge.

6. A finely-divided water-dispersible agricultural parasiticide consisting essentially of sulphur comprising in intimate dispersion therewith from 1 to 20 per cent by weight of an activated sewage sludge.

7. A finely-divided agricultural parasiticide comprising an intimate mixture of sulphur, a phenol-sulphonic acid sodium salt, and a minor proportion of an activated sewage sludge.

8. A method for activating finely-divided sulphur compositions comprising mixing a minor proportion of a partially bacteria-digested sewage sludge therewith.

FOREST R. MINGER.
WAYNE L. SCOLES.